3,374,070
METHOD OF PRODUCING A PREPARED QUICK-IGNITING CHARCOAL FUEL
Claude E. Davis, Fullerton, Calif., assignor of ten percent to Collins Mason, Los Angeles, and ten percent to William R. Graham, Palos Verdes Estates, California
No Drawing. Continuation-in-part of abandoned application Ser. No. 259,716, Feb. 19, 1963. This application Jan. 10, 1966, Ser. No. 519,468
3 Claims. (Cl. 44—6)

This application is a continuation-in-part of my copending application Ser. No. 259,716, filed Feb. 19, 1963 and now abandoned.

My invention has to do with methods of producing charcoal fuel bodies characterized by being fully impregnated throughout as well as surface-coated with a relatively more flammable non-volatile material such as wax or its equivalent.

Prior quick-igniting charcoal fuels have been of two general types: In one type, the charcoal body is impregnated with a volatile liquid such as alcohol or the like which readily soaks into the charcoal body to thoroughly impregnate it. That type, however, must be hermetically sealed during storage and sales display. In the other type the charcoal bodies are surface-coated with a substantially non-volatile material such as wax which does not penetrate the charcoal body below the surface. While the surface coat readily ignites, it becomes consumed by the flame before the core and other subsurface portions of the body become ignited, frequently necessitating the use of another fuel to accomplish the complete combustion of the body.

It is therefore a principal object of my invention to provide a method by which the charcoal bodies will not only receive a surface coating of wax but by which the core and other subsurface areas of the charcoal body will be exhausted of moisture and entrapped gases and then impregnated by the wax, so that, once the surface coat is initially ignited, the combustion of the body will continue without interruption until the charcoal body is consumed. That is, the impregnation tends to wick the flame into the core of the body and aids in the combustion.

It is a further object to provide a method which incorporates, in a novel manner, the use of an oxidizing agent which becomes so dispersed in the charcoal body as materially to enhance the wicking and combustion-aiding effect of the impregnating wax.

Without intending to limit the broader aspects of my invention, I shall now describe preferred specific examples of the practice of my method.

*Example 1*

I first provide a charcoal body, which may be either in lump form or which might be a briquette formed by compressing pulverized charcoal ingredients. For the wax used in the practice of my method I prefer to use paraffin wax of commercial grades and preferably waxes which have a melting point of 125° F. to 138° F. can be used. Also petroleum wax can be used.

I place the wax in a vessel and heat the vessel to the melting temperature of the wax to produce a body of viscous molten wax. I then introduce the charcoal body and maintain it submerged in the wax and further heat the wax to a temperature of 250° F. to 300° F. or at least twice its melting temperature, for a period sufficient to exhaust the moisture and gases entrapped in the body so as to create voids therein. This further heating usually requires a period of 20–30 minutes. I then discontinue the heat and allow cooling until the wax replaces the evacuated moisture and gases in the charcoal bodies, which point is indicated by the disappearance of gas bubbles on the surface of the wax, which occurs by the time the temperature is reduced substantially to the melting point of the wax. This cooling period allows the wax to be drawn into and fully impregnate the charcoal bodies, so that the drawn-in wax will have the effect of wicking the flame from the surface into the sub-surface areas of the charcoal bodies. The proportion of wax to the charcoal bodies will, of course, vary with the porosity of the charcoal bodies, it being only necessary that there be sufficient molten wax to maintain the charcoal bodies submerged until the operation is completed. Usually I have found that, by weight, one part of wax suffices for each four parts of charcoal.

*Example 2*

The procedure is the same as specified in Example 1, except that I add an oxidizing agent, preferably sodium nitrate which I have found to be the least toxic for cooking purposes, although other well known oxidizers may be used.

The oxidizer is introduced in either of the following manners: If the charcoal bodies are compressed briquettes of pulverized charcoal, I admix the oxidizing agent with the pulverized charcoal before it is compressed into briquettes so that it becomes thoroughly distributed throughout the charcoal body. If the charcoal bodies are in the form of lumps of charcoal, I form an aqueous solution of the oxidizing agent and admix it with the molten wax during the heating period.

A fuel body formed by my method is substantially waterproof; its protective surface coating can be readily ignited by exposing it to flame; and the flame will be effectively wicked into the core areas of the charcoal body to aid in the complete combustion thereof after once having the surface coating initially ignited. The oxidizing agent materially enhances the combustion.

I claim:
1. The method of producing a readily flammable wax-coated and impregnated charcoal body which consists of the sequential steps of separately heating wax to its melting temperature; submerging said charcoal body in said molten wax and maintaining it so submerged while further heating the molten wax to at least twice the temperature of its melting point, whereby to evacuate entrapped moisture and gases from said charcoal body to produce voids therein; then cooling said molten wax and charcoal body to the melting temperature of said wax whereby to cause said wax to fill said voids, and then removing said charcoal body from said molten wax.

2. The method of claim 1 wherein said charcoal body has sodium nitrate dispersed therein.

3. The method of claim 1 wherein the melting temperature of said wax is 125° F.–138° F.

References Cited

UNITED STATES PATENTS

| | | | |
|---|---|---|---|
| 1,106,289 | 8/1914 | Dymond | 44—17 |
| 2,842,431 | 7/1958 | Robertson | 44—41 |
| 2,849,300 | 8/1958 | Berman et al. | 44—17 |

FOREIGN PATENTS

| | | |
|---|---|---|
| 477,770 | 10/1951 | Canada. |
| 621,187 | 5/1961 | Canada. |

DANIEL E. WYMAN, *Primary Examiner.*
C. F. DEES, *Assistant Examiner.*